No. 696,397. Patented Apr. 1, 1902.
A. A. BALL, Jr.
FRAME FOR SELF PROPELLED VEHICLES.
(Application filed Dec. 11, 1901.)
(No Model.) 4 Sheets—Sheet 1.

Witnesses:

Inventor,
Augustus A. Ball Jr,
By Albert G. Davis
Att'y.

No. 696,397. Patented Apr. 1, 1902.
A. A. BALL, Jr.
FRAME FOR SELF PROPELLED VEHICLES.
(Application filed Dec. 11, 1901.)
(No Model.) 4 Sheets—Sheet 2.

Witnesses:
R. C. Chapman
Alex F. Macdonald

Inventor,
Augustus A. Ball Jr.
By Albert G. Davis
Att'y.

THE NORRIS PETERS CO., PHOTO-LITHO., WASHINGTON, D. C.

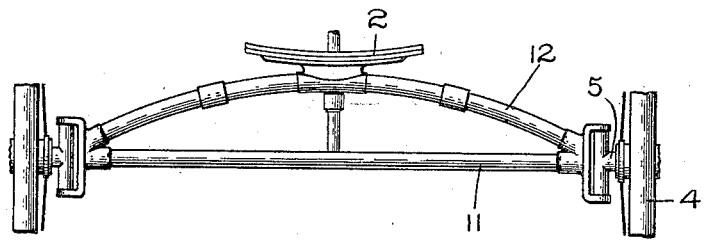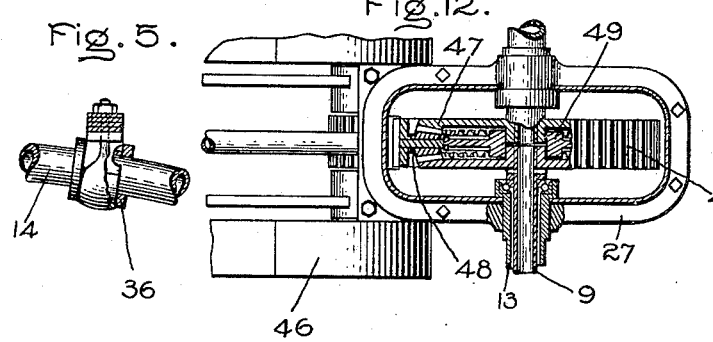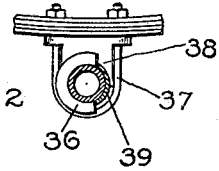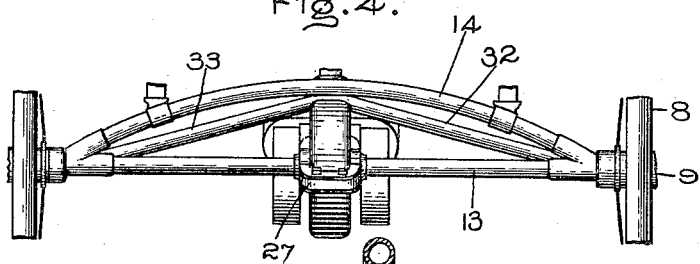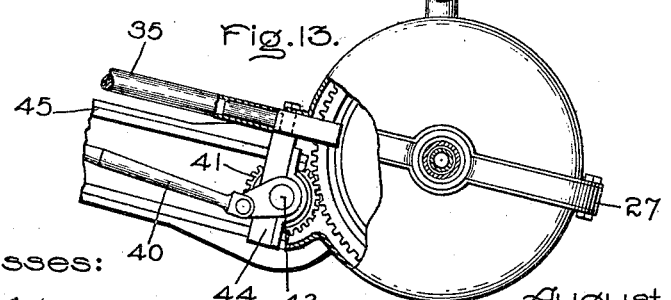

No. 696,397. Patented Apr. 1, 1902.
A. A. BALL, Jr.
FRAME FOR SELF PROPELLED VEHICLES.
(Application filed Dec. 11, 1901.)
(No Model.) 4 Sheets—Sheet 4.
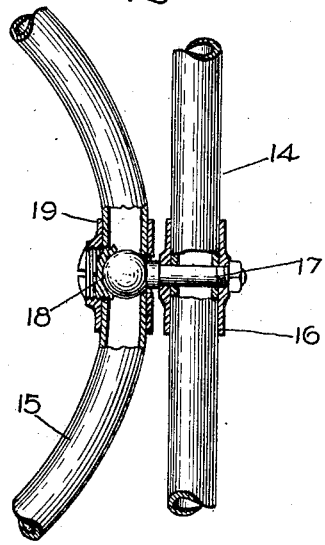
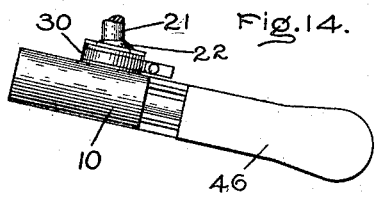
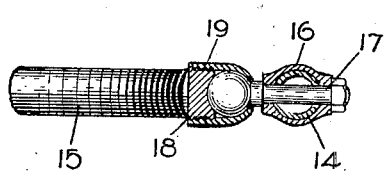
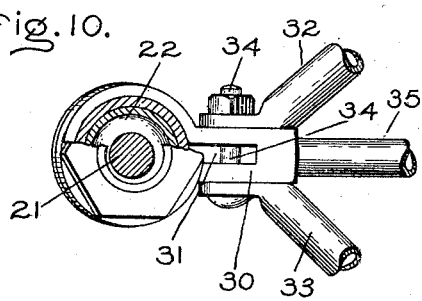
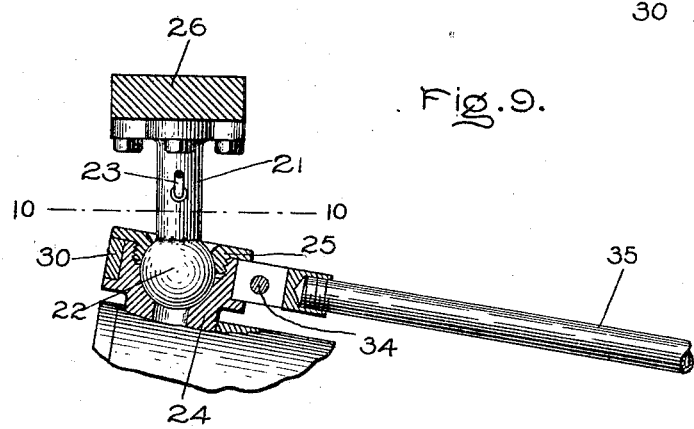
Witnesses:
R. C. Chapman
Alex F. Macdonald.
Inventor,
Augustus A. Ball Jr,
BY Albert G. Davis,
Att'y.

United States Patent Office.

AUGUSTUS A. BALL, JR., OF LYNN, MASSACHUSETTS, ASSIGNOR TO ELIHU THOMSON, OF SWAMPSCOTT, MASSACHUSETTS.

FRAME FOR SELF-PROPELLED VEHICLES.

SPECIFICATION forming part of Letters Patent No. 696,397, dated April 1, 1902.

Application filed December 11, 1901. Serial No. 85,468. (No model.)

*To all whom it may concern:*

Be it known that I, AUGUSTUS A. BALL, Jr., a citizen of the United States, residing at Lynn, in the county of Essex, State of Massachusetts, have invented certain new and useful Improvements in Frames for Self-Propelled Vehicles, (Case No. 2,337,) of which the following is a specification.

The present invention has for its object to provide a vehicle-frame which is simple in construction, is rigid within itself, and is capable of accommodating itself without undue strains to irregularities in the road-bed as the wheels pass over them. The scope of my invention will be more fully set forth and claimed hereinafter.

Figure 1:
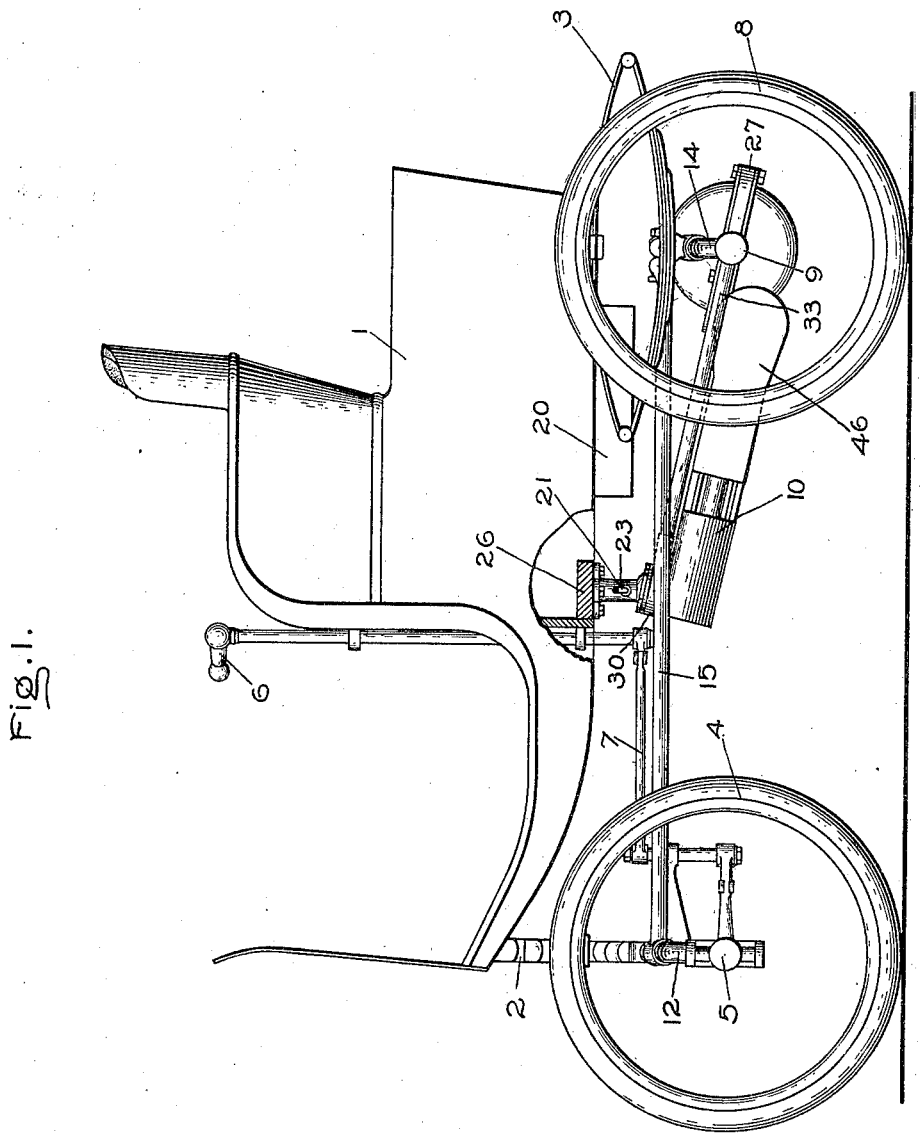
Figure 2:
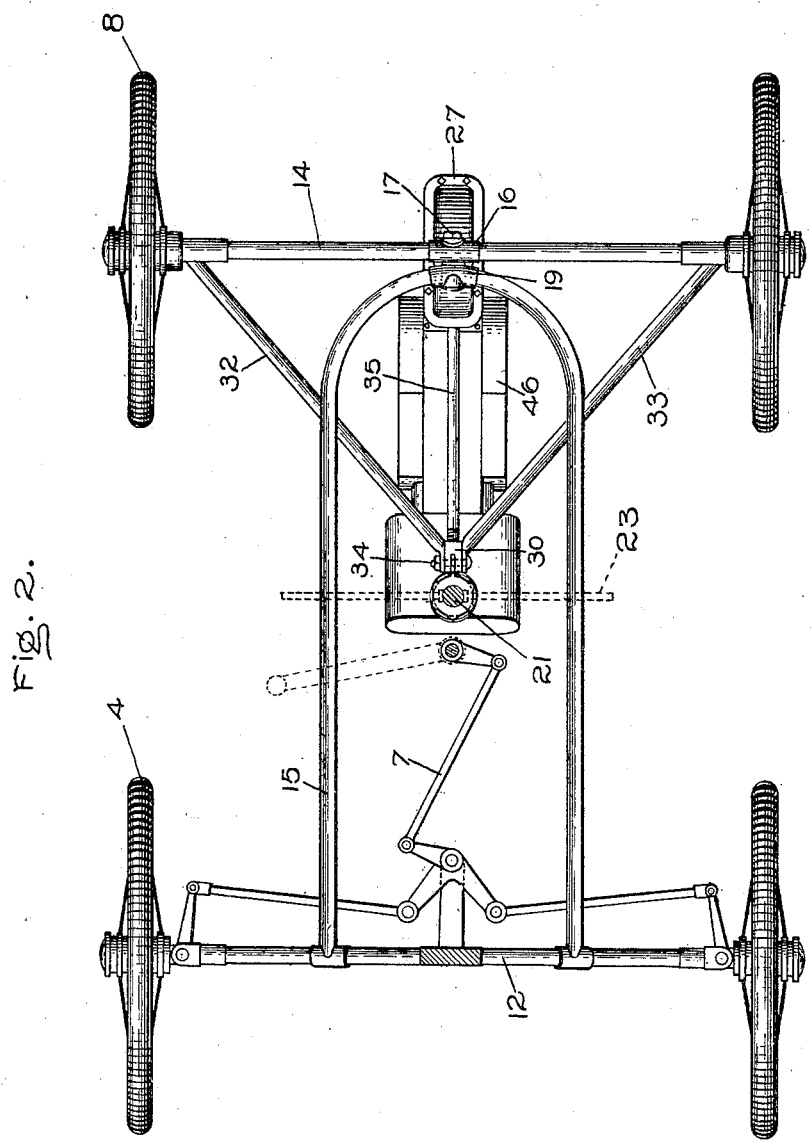

In the accompanying drawings, which illustrate an embodiment of my invention, Figure 1 is a side elevation of a vehicle. Fig. 2 is a plan view of the frame thereof with the body removed. Fig. 3 is a view in elevation of the front axle. Fig. 4 is a view in elevation of the rear axle. Figs. 5 and 6 are respectively a side and an end elevation of the means employed for clamping the springs. Fig. 7 is a plan view, partially in section, of the means employed for holding certain of the frame parts together. Fig. 8 is a cross-section of the connecting device shown in Fig. 7. Fig. 9 is a detail view of the engine suspension. Fig. 10 is a sectional view taken on line 10 10 of Fig. 9. Fig. 11 is a detail view of the ball-joint. Fig. 12 is a sectional view illustrating the differential gearing. Fig. 13 is a side elevation of the differential gear-case with certain of the parts broken away, and Fig. 14 is a detail view of the engine-support located at the center of gravity.

Referring to Fig. 1, 1 represents the vehicle-body, which is supported at the front by a spring 2 and at the rear by spring 3. The steering-wheels 4 are mounted on short axles 5 and are connected to the steering-handle 6 through the intermediate levers 7. The driving-wheels 8 are mounted on the rear axle 9 and are driven from the engine 10 in a manner to be described more fully hereinafter. The front axle consists of a straight member 11 and an arched member 12, as clearly shown in Fig. 3. The rear axle consists of a straight tubular member 13 and an arched member 14, as clearly shown in Fig. 4.

Referring now to Fig. 2, 15 represents a U-shaped frame, which is rigidly secured to the arched member 12 of the front axle. The rear or curved portion of the frame is secured to the arched member 14 of the rear axle by a ball-and-socket joint, by means of which the steering-wheels are permitted to rise and fall with respect to the vehicle-body as they pass over irregularities in the road-bed without straining the frame as a whole. The supporting-springs and the body serve to hold the front and rear axles in parallel relation.

Referring now to Figs. 7 and 8, the joint between the U-shaped frame 15 and the arched member 14 of the rear axle will be described. Mounted on the arched member 14 is a sleeve 16, which is brazed or otherwise secured in place. Extending through the sleeve and the arched member is a bolt 17, having a spherical head which is seated in a cup-shaped socket or support 18, carried by the U-shaped frame member 15. The frame is reinforced at this point by the sleeve 19, which is brazed or otherwise secured in place. The socket 18 is provided with a screw-thread, whereby it may be adjusted in place. When it is desired to separate the parts of the frame for any reason, the screw-threaded plug 18 is removed, after which the bolt 17 can be taken out, the diameter of the head of this bolt being slightly smaller than the diameter of the socket. The object in forming the frame-bar 15 as shown is to provide room for the boiler and burner-casing 20, Fig. 1, when the vehicle-body is depressed. In other words, by utilizing this particular type of frame-bar I am enabled to make the carriage more compact and lower the center of gravity, which is an important consideration in vehicles of the self-propelled class. It is preferable to make the side bars of frame 15 straight on account of reduced cost in manufacture, and the curve at the end being of large radius does not involve any particular skill on the part of the workmen. The joint between the frame and the rear axle is simple and can be made by automatic machinery when made in large quantities.

Extending transversely across the vehicle-body is a brace or support 26, and secured thereto is a downwardly-projecting stud 21, Figs. 1, 9, and 10. The stud is provided at its lower end with a ball 22, which is secured thereto in a manner illustrated in Fig. 11. The stud 21 is braced against lateral thrusts by the braces 23, which extend toward opposite sides of the vehicle, as illustrated in dotted lines, Fig. 2. The ball 22 fits into a socket 24, and the latter is detachably secured to the engine 10. The ball is retained in place in the socket by the nut 25. Between the nut and a shoulder formed on the support 24 is a clamp 30, which is slotted at 31, Fig. 10, to give it a certain amount of spring. Extending diagonally from the projection on the clamp 30 are two frame-bars 32 and 33, Fig. 2. These bars are rigidly secured to the rear axle and are secured to the projection on the clamp by the bolt 34. The latter also serves to hold the clamp in place. In the right-hand end of the clamp is formed a socket for the distance rod or tube 35, the latter being rigidly secured in place. The opposite end of the bar is mounted in the yoke 27, which incloses the differential gears. The object of this rod is to maintain the ball-support 22 at a fixed distance from the center of the driving-shaft.

It will be seen from the construction described that in effect two triangular frames are provided, one being rigidly secured to the front axle and pivotally secured to the rear axle, the other being rigidly secured to the rear axle and pivotally secured to the vehicle-body, and that between the pivotal support and the axle a bar is provided for maintaining the parts in fixed relation, so that the driving mechanism can be maintained in proper adjustment. The construction of the frame and the supports prevents the vehicle-body from moving relative thereto in a manner to affect the steering apparatus—that is to say, sudden shocks do not alter the relation between the steering-handle and the wheels. This arrangement also relieves the springs in a great measure of the strains due to sudden starting and stopping. The arrangement of the frame, and particularly of the member 15, gives more room for the boiler, as well as for the engine, and renders the parts more accessible.

The ball-support 24, which is detachably mounted on the engine, is preferably located near the center of gravity of the engine, as illustrated in Fig. 14. The engine extends considerably farther on one side of the support than it does on the other; but since the greater portion of the weight is found in the pistons and cylinders the center of gravity will be found at substantially the point shown. The support 22, to which the ball-supporting stud is secured, is also preferably located at the center of gravity of the vehicle as considered when loaded. It should also be near or at the center of the body. When arranged as described, the body will not rock as it moves up and down under the action of the springs. The rocking referred to is highly objectionable, and by my invention it is wholly overcome.

In order to permit a slight angular movement between the rear springs 3 and the arched member of the rear axle, special supporting devices are provided. These are best shown in Figs. 5 and 6. Rigidly secured to the arched member 14 by brazing or otherwise is a sleeve 36, which is provided with shoulders at opposite ends to prevent the U-shaped clamp 37 from slipping laterally. Between the sleeve and the clamp is a support consisting of the block 38 for the spring and the segmental sleeve 39. When the block 38 and the segmental sleeve 39 are clamped together by the clamp 37, a slight clearance is provided around the sleeve 36, whereby the parts are free to turn slightly. By providing a very slight space between the sleeve 36 and the clamp all tendency for the parts to bind as they move with respect to each other is obviated, and at the same time the requisite freedom of motion is obtained.

The engine 10 may be of any suitable construction. In the present instance I have shown a two-cylinder double-acting steam-engine, the connecting-rods 40 being arranged to drive the pinion 41, the latter meshing with the driving-gear 42. The crank-shaft 43 is supported in bearings carried by the vertical piece 44, the latter being secured to the axle-yoke 27. The yoke is rigidly secured to the rear tubular axle or support 13, and rotating in ball-bearings within said support is the axle 9, to which the driving-wheels are rigidly secured. Extending between the crank-shaft bearings and the engine are supports 45, preferably forming a part of the engine, which maintain the bearings in fixed alinement. The connecting-rods 40 are inclosed in cases 46, in which they can be run in oil. They are also protected from dust and dirt. On the adjacent ends of the axle 9 are the bevel-gears 47, which mesh with the pinions 48, mounted on spindles carried by the spur-gear 42. Sleeved on the inner hubs of the bevel-gears is a four-armed wheel 49, which assists in supporting the pinions 48.

In carrying out the invention it will be seen that the engine enters into the frame construction to the extent that it carries or is secured to the support 24. It is obvious, however, that the engine can be so arranged that it is entirely independent of the support 24 and still be within the scope of my invention.

What I claim as new, and desire to secure by Letters Patent of the United States, is—

1. In a vehicle, the combination of a front and a rear axle, a body, a frame rigidly secured to one axle and pivotally secured to the other, and a second frame rigidly secured to one axle and pivotally secured to the body.

2. In a vehicle, the combination of a front and a rear axle, a body, springs located between the vehicle-body and the axles, a frame rigidly secured to one axle and pivotally secured to the other, and a second frame rigidly secured to one axle and pivotally secured to the spring-supported body.

3. In a vehicle, the combination of a front and a rear axle, a body, a U-shaped frame rigidly secured to one axle and pivotally secured to the other, and a triangular frame pivotally secured at its apex to the vehicle-body, and rigidly secured at its ends to the other axle.

4. In a vehicle, the combination of a front and a rear axle, a body, springs between the body and the axles, a frame rigidly secured to one axle and pivotally secured to the other, a second frame rigidly secured to one axle, and a pivotal support for the second frame mounted on the vehicle-body at approximately its center of gravity.

5. In a vehicle, the combination of a driving and a driven axle, a body, springs located between the body and the axles, a frame rigidly secured to the driven axle and pivotally secured to the driving-axle, a second frame rigidly secured to the driving-axle and pivotally secured to the spring-supported body, and a bar which is connected to the driving-axle and to the pivotal connection on the body and forms a brace between them.

6. In a vehicle, the combination of a body, front and rear axles, springs between the body and the axles, a frame rigidly secured to the rear axle, a ball-and-socket connection for securing the frame to the body, and a bar which is secured to the rear axle at one end and to the ball-and-socket connection at the other.

7. In a vehicle, the combination of a body, front and rear axles, springs between the body and the axles, a frame rigidly secured to the rear axle, a ball-and-socket connection for securing the frame to the body, a yoke in the rear axle for inclosing the differential gearing, and a bar which is secured to the ball-and-socket connection at one end and to the yoke at the other.

8. In a vehicle, the combination of a body, front and rear axles, springs between the body and the axles, a frame rigidly secured to the rear axle, an engine, a ball-and-socket joint for securing the frame to the body, one portion of said joint being secured to the vehicle-body, the other being secured to the engine, a yoke in the rear axle, a connection between the yoke and the engine, and a bar which is secured to the yoke and to that portion of the ball-and-socket joint which is carried by the engine.

9. In a vehicle, the combination of a body, front and rear axles, springs between the body and the axles, a frame rigidly secured to the rear axle, an engine, a universal connection between the engine and the body, one portion of said connection being carried by the body, the other by the engine, a bar which is secured to the rear axle at one end, and a clamp for the opposite end of the bar which is mounted on that portion of the connection carried by the engine.

10. In a vehicle, the combination of front and rear axles, a body, springs between the body and the axles, an engine, a universal connection between the engine and the body, one portion of which is mounted on the engine, the other on the body, an axle-yoke, a distance-bar secured thereto, a pair of frame-bars rigidly secured to the rear axle, and a clamp mounted on the engine portion of the connection to which the distance and frame bars are secured.

11. In a vehicle, the combination of front and rear axles each provided with a straight and an arched member, a body, a frame which is rigidly secured to the arched member of the front axle and pivotally secured to the arched member of the rear axle, a second frame which is rigidly secured to the rear axle, and pivotally secured to the vehicle-body, springs for the body, and clamps for securing certain of the springs to the arched member of the rear axle, the said clamp permitting a certain amount of independent movement.

12. In a vehicle, the combination of a spring, an axle, collars mounted thereon, a support for the spring, a segmental sleeve, and a U-shaped clamp for holding the support and sleeve in place.

In witness whereof I have hereunto set my hand this 9th day of December, 1901.

AUGUSTUS A. BALL, JR.

Witnesses:
 DUGALD McK. McKILLOP,
 ROBERT SHAND.